United States Patent Office 3,389,121
Patented June 18, 1968

3,389,121
RESINS AND PROCESSES OF MAKING THE SAME
Alfred J. Burzynski and Robert E. Martin, Toledo, Ohio, assignors to Owens-Illinois, Inc., a corporation of Ohio
No Drawing. Continuation-in-part of application Ser. No. 520,893, Jan. 17, 1966, which is a continuation-in-part of applications Ser. No. 261,226, Feb. 26, 1963, Ser. No. 279,317, May 9, 1963, and Ser. No. 306,344, Sept. 3, 1963. This application Oct. 18, 1967, Ser. No. 676,081
10 Claims. (Cl. 260—46.5)

ABSTRACT OF THE DISCLOSURE

Organopolysiloxane resins produced by the cohydrolysis and co-condensation of different alkoxysilanes employing the steps of (a) heating the reaction mixture to form a partial condensation product, (b) concentrating this produce; (c) precuring the concentrated product; and (d) finally curing the precured product. The resins are useful as machinable, heat-resistant, thermoset bodies or as coatings.

CROSS-REFERENCE TO RELATED APPLICATIONS

This invention is a continuation-in-part of our co-pending application Ser. No. 520,893, filed Jan. 17, 1966 now abandoned. Application Ser. No. 520,893 is a continuation-in-part of our prior applications Ser. Nos. 306,344, filed Sept. 3, 1963, 279,317, filed May 9, 1963, and 261,226, filed Feb. 26, 1963, said last three applications having now been abandoned. The assignee of all of the aforementioned applications is either the same as that of the instant corporate assignee or its predecessor corporation.

THE INVENTION

The present invention relates broadly to polysiloxane resins and to a process for their manufacture. More particularly it relates to the production of heat-resistant articles including coatings, films and machinable organopolysiloxane bodies. The scope of the invention includes both composition and method features.

Most silanols, i.e., silicon compounds which possess one or more hydroxyl groups bonded to a silicon atom, tend to form the corresponding ether analogs (siloxanes) by a reaction involving the lose of one molecule of water per two such hydroxyl groups. This is evidenced by the fact that the majority of known silanols have not been isolated in the pure, monomeric form; silicic acid itself, $Si(OH)_4$, is an example. Further evidence is provided by the fact that where intermolecular or intramolecular condensation products are possible, a mixture of both is usually obtained. When two or more silanol groups are present per molecule, either intermolecular or intramolecular condensation may predominate, depending largely on the concentration and the steric requirements of the reactants. The reactivity of silanols to form siloxanes is so great that a high degree of selectivity in product formation is seldom possible, and the complexity of the reaction mixture often precludes practicable identification of specific products. In general, siloxane formation can be accelerated by an acidic or basic catalyst, or by heat.

If attention is limited to compounds which possess only one silicon atom per molecule, four broad types of silanols are possible: (1) silanol, $H_3SiOH$, and its substitution products of the formula $Y_3SiOH$, (2) silanediol, $H_2Si(OH)_2$, and its substitution products of the formula $Y_2Si(OH)_2$, (3) silanetriol, $HSi(OH)_3$, and its substitution products of the formula $YSi(OH)_3$, and (4) silicic acid, $Si(OH)_4$, which may be regarded as an anomalous member of the series; in these formulas Y represents independently selected monovalent hydrocarbon radicals. Besides self-condensation, siloxane formation can result from the reaction of any two or more representatives of each of these classes.

Linear condensation can occur by any combination of representatives of class (2) and/or class (3):

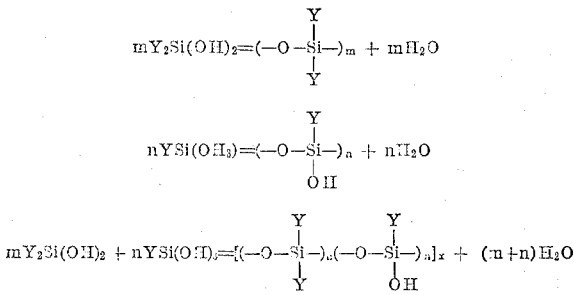

In these equations $m$ and $n$ are independently any positive integer. Silanols of type (1) if present will operate as chain terminating agents, since they are monofunctional; inclusion of silicic acid will allow formation of polysiloxanes which contain silicon atoms in the chain which are bonded to two hydroxyl groups. The linear polymers of the last two equations are susceptible to further siloxane formation through the interior silanol groups, and if this process occurs intermolecularly, cross-linking results. Although, as mentioned, heat generally promotes formation of siloxanes from silanols, mixtures which contain water and linear polysiloxanes of the type represented in the equations above may exhibit thermoplastic properties, i.e., they may increase in fluidity on heating. This may be attributed to reversal of the equilibria shown by attack of water on interior siloxane linkages weakened by thermal agitation of the large polysiloxane molecules. If conditions which promote depolymerization, especially the presence of substantial quantities of water, are absent, however, application of heat can lead to cross-linking, increasing the viscosity and ultimately causing formation of hard resins; polysiloxanes which behave in this way are characterized as "thermosetting" resins, and the heat-set, cross-linked resins as "thermoset" resins.

The high reactivity of most silanols makes it desirable to form them in situ. This is usually accomplished by hydrolysis of precursors which contain silicon atoms attached to substituents which are readily converted to hydroxyl groups. These hydrolyses reactions may be illustrated as follows:

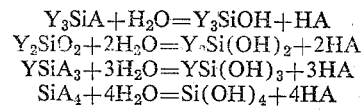

in which A represents a hydrolyzable group such as alkoxy, acyloxy, halogen, etc. When the compound HA is acidic, it will catalyze conversion of the silanol to the corresponding siloxane.

Much research has been expended on organopolysiloxanes, and compositions are known which are useful as lubricants, laminating media, protective films, and similar products. However, it has previously been impossible to produce strong, relatively thick organopolysiloxane bodies free of interior deformations or voids. In the broader field of plastic compositions, it has not been possible heretofore to obtain thermosetting resins, devoid of substantial quantities of fillers, which when thermoset could be drilled, grooved, threaded, ground, turned on a lathe, or otherwise machined without suffering fragmentation caused by their inherent brittleness; while thermoplastic resins are often capable of being machined, their breakdown at higher temperatures is often a disadvantage.

It is an object of the present invention to provide methods for producing organopolysiloxane resins as well as the resins themselves.

It is another object to provide a method for producing solid, relatively thick, strong organopolysiloxane bodies.

It is a further object to provide a method for producing solid, clear, machinable thermoset organopolysiloxane bodies.

It is a still further object to provide a method for producing relatively thick, heat-resistant, solid, organopolysiloxane bodies of preselected dimensions.

It is another object of this invention to provide methods for forming solid organopolysiloxanes from methyltrialkoxysilane and phenyltrialkoxysilane monomers.

Another object of the invention is to provide organic solvent-soluble organopolysiloxane resins (i.e., siloxane partial condensation products) both in liquid and solid form, and a method of making such resins. Such resins are useful, for example, in making coating compositions, as casting resins, and as solid, thermosetting (heat-softenable) molding compositions from which thermoset molded articles can be made.

These and other objects and advantages of the present invention will become evident from the following description.

According to the present invention, a mixture which comprises a precursor hydrolyzable to methylsilanetriol or its condensation product, a precursor hydrolyzable to phenylsilanetriol, and water is heated, the reaction mixture is concentrated by removing a substantial portion but not all of the volatile components, heated above the boiling point of pure water at the prevailing pressure, formed and heated at a temperature below the boiling point of pure water at the prevailing pressure to provide a machinable, thermoset, heat-resistant organopolysiloxane body.

In the procedure of this invention usually a mixture which comprises a hydrolyzable methyltrialkoxysilane, a hydrolyzable phenyltrialkoxysilane, and water in a relative molar ratio of $x:y$:at least $1.5(x+y)$, respectively, wherein $x$ and $y$ are independently selected from the range 1 to 10, is heated at a temperature between ambient temperature and reflux temperature for a time of 1 to 10 hours; 50 to 90 mole percent of the alkanol side product is removed by volatilization; the reaction mixture is heated to effect precure at a temperature within the range of up to 100 centigrade degrees above the boiling point of pure water at the prevailing pressure for a time up to 30 minutes; and the resinous mixture thus obtained is formed, usually by casting, and then cured for a time of at least 1 hour and up to thirty days at a temperature of from 1 centigrade degree to 60 centigrade degrees below the boiling point of pure water at the prevailing pressure to give a machinable, thermoset, heat-resistant organopolysiloxane body.

The methyltrialkoxysilanes and phenyltrialkoxysilanes cited herein refer to compounds of the formula $$CH_3Si(OR)_3$$

and $C_6H_5Si(OR)_3$, wherein R represents a monovalent alkyl radical of less than five (i.e., 1–4) carbon atoms. Examples of such methyltrialkoxysilanes are methyltrimethoxysilane, methyltriethoxysilane, methyltri(1-propoxy)silane, methyltri(2 - propoxy)silane, methyltri(2-methyl - 2 - propoxy)silane, methyltri(1 - butoxy)silane, and methyltri(2 - butoxy)silane; examples of phenyltrialkoxysilanes are phenyltrimethoxysilane, phenyltriethoxysilane, phenyltri(1 - propoxy)silane, phenyltri(2 - propoxy)silane, phenyltri(2 - methyl - 2 - propoxy)silane, phenyltri(1 - butoxy)silane, and phenyltri(2 - butoxy)silane.

A further aspect of this invention which provides an especially heat-resistant, machinable, thermoset, organopolysiloxane body comprises heating a mixture which comprises a hydrolyzable methyltrialkoxysilane, a hydrolyzable phenyltrialkoxysilane, and water in a relative molar ratio of $x:y$:at least $1.5(x+y)$, respectively, wherein $x$ and $y$ are independently selected from the range 1 to 10, at a temperature between ambient temperature and 150° C. for a time of 1 to 10 hours; removing 50 to 90 mole percent of the alkanol side product by volatilization; heating the reaction mixture to effect precure at a temperature within the range of from 70° C. to 400° C., but usually not above 250° C. for a time up to 30 minutes; casting and then curing the resinous mixture thus obtained for at least one day at a temperature within 10 centigrade degrees below the boiling point of pure water at the prevailing pressure, then at a temperature increasing continually up to a maximum of 350° C. over a period of from 2 to 30 days, and finally allowing the sample to return slowly to ambient temperature over a time of from 1 to 12 hours.

A preferred procedure of this invention comprises heating a reaction mixture which comprises methyltriethoxysilane, phenyltriethoxysilane, and water in a relative molar ratio of $x:y$:at least $1.5(x+y)$, respectively, wherein $x$ and $y$ are independently selected from the range 1 to 5, at reflux temperature for 2 to 4 hours; distilling 70 to 80 percent of the theoretical ethanol which will also contain 5 to 15 percent water from the reaction mixture, subjecting the distillation residue to a precure at 110° to 200° C. for a time up to ten minutes at ambient pressure; and finally casting and then curing the resultant resinous mixture at 25° to 95° C. and about atmospheric pressure for a time of from one day to one week to give a machinable, thermoset, heat-resistant organopolysiloxane body.

Where the ratio of reactants is cited above as $x:y$:at least $1.5(x+y)$, it has been found that a convenient ratio is usually about $x:y:3(x+y)$. In other words, on a molar basis the ratio of water to the sum of $x+y$ is a minimum of 1.5 and usually is about 3. This is further illustrated in the examples below.

The initial reaction mixture of the cited procedure contains an acidic catalyst, although after hydrolysis, subsequent condensations may proceed at a convenient rate without it. To avoid premature gelation of the resins the quantity of acid in the reaction mixture must be below 0.01 mole of acid per mole of hydrolyzable silanol precursor, particularly at the high molar ratios of water to silane reactant material. Similarly a solvent, e.g. ethanol, can be added to render the reaction mixture homogeneous.

The advantageous properties of the products of this invention are believed to reside in the use of the hydrolyzable precursors of the formula $CH_3Si(OR)_3$ and $C_6H_5Si(OR)_3$ previously described, wherein R represents a monovalent alkyl radical of less than five carbon atoms, as well as in the process described. However, it is within the purview of the invention to modify the properties of the product by including small amounts of other silane reactants. Thus, the initial reaction mixture can contain precursors of methylsilanetriol and phenylsilanetriol in the defined ratios and 0 to 10 mole percent, usually 0 to 5 mole percent, of a coreactant; these mole percentages are based on the hydrolyzable silane components of the initial mixture. The coreactant when present usually comprises at least 1 mole percent of the mixture, and comprises at least one compound, different from methylsilanetriol, phenylsilanetriol and from precursors (including alkoxy derivatives) of said silanols, of the formula

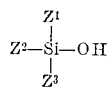

wherein $Z^1$, $Z^2$ and $Z^3$ represent monovalent radicals independently selected from the group consisting of hydrocarbon aryl, alkyl and alkenyl radicals, each of which contains less than seven (i.e. 1 to 6) carbon atoms, and the hydroxyl radical. Examples of such coreactants are trimethylsilanol, tri(1-methylethyl)silanol, trihexylsilanol, di(1-methylpropyl)silanediol, divinylsilanediol, diphenylsilanediol, propylpentylsilanediol, methylallylsilanediol, vinylphenylsilanediol, ethysilanetriol, 1-methylethylsilanetriol, 1,1-dimethylethylsilanetriol, 2,2-dimethylpropylsilanetriol, hexylsilanetriol, and vinylsilanetriol. These coreactants can be added to the reaction mixture in the form of their precursors of the formula:

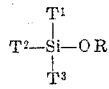

wherein $T^1$, $T^2$ and $T^3$ represent monovalent radicals independently selected from the group consisting of hydrocarbon aryl, alkyl and alkenyl radicals, each of which contains less than seven carbon atoms, and the alkoxy radical RO—, wherein R has the meaning previously defined. Examples of such precursors are trimethylmethoxysilane, tri(1-methylethyl)ethoxysilane, trihexyl(1,1-dimethylethoxy)silane, di(1-methylpropyl)diethoxysilane, divinyldipropoxysilane, diphenyldiethoxysilane, propylpentylmethoxyethoxysilane, methylallyldi(1-methylethoxy)silane, vinylphenyldimethoxysilane, ethyltriethoxysilane, (1-methylethyl)trimethoxysilane, (1,1-dimethylethyl)tripropoxysilane, (2,2-dimethylpropyl)tributoxysilane, hexyltriethoxysilane, and vinyltriethoxysilane.

A further variation in the procedure can be achieved by hydrolyzing individually a hydrolyzable methyltrialkoxysilane and a hydrolyzable phenyltrialkoxysilane, and then combining the resultant organopolysiloxanes to form the initial reaction mixture described above. The resultant resinous mixture ultimately yields, by the method described, a machinable, thermoset, heat-resistant organopolysiloxane body.

During the initial hydrolysis, it is probable that condensation of the resultant silanols also occurs by reactions of the type already cited. Since water is a by-product of siloxane formation, the lower limit to the amount of water which can be added to the initial reaction mixture can be defined as HS/2, where H is the number of hydrolyzable groups per molecule and S is the moles of silanol precursor used, assuming complete conversion of all silanol groups to siloxane linkages (in other words, the amount of water corresponds to at least 0.5 equivalent weight per equivalent weight of the —RO groups that are present in the reactants of A, B, and C). During the concentration step, the increasing proximity of the remaining silanol functions probably leads to further linear polymerization, and to some cross-linking; if concentration is carried beyond the cited limits, premature gelation can occur.

In the precure step the concentrated resinous mixture is heated to a temperature above the boiling point of pure water at the prevailing pressure for a specified time, usually with stirring. The time and temperature of precure are determined by the particular composition used, but in general a temperature of 110° to 200° C. at ambient pressure and times up to 30 minutes are usual. The elimination of water and other volatile materials from the reaction mixture at this point leads to further polymerization and the mixture becomes increasingly viscous. If the precure step is omitted from the process, the cast resins will crack severely during the final curing step and will not provide machinable, heat-resistant bodies of relatively large size.

Additives believed to be chemically inert under the reaction conditions can be added to obtain desired variations in properties. Fillers such as silica, unreactive organosilanes, amine-clay derivatives, various clays, and asbestos are suitable. Coloring agents, that is, alcohol or water-soluble dyes or insoluble pigments, can be added to the reaction mixtures of the present invention at any time prior to the end of the precure step, to give organopolysiloxane bodies of the type described which are also colored; the products thus obtained are useful as colored light filters. Suitable dyes for use in the process of the present invention include triarylamine dyes, such as mauveine, pseudomauveine, and safranine T; triarylmethane dyes, such as rosaniline, Melachite Green, and aurintricarboxylic acid; phthalein dyes, such as fluorescein and eosin; cyanine dyes such as 1,1'-diethyl-4,4'-cyanine, 1,1',6-trimethylisocyanine iodide, and pseudocyanine; anthraquinoid dyes such as alizarin, Alizarin Blue, and Anthracene Blue WSR; indigoid dyes such as indigo, thioindigo, and Indigo Yellow 3G, flavanthrone and Violanthrone; sulphur dyes such as Immedial Pure Blue; azo dyes, such as Scarlet Red, Amaranth, and Congo Red; and phthalocyanines, such as copper phthalocyanine. The quantity of dye or pigment and the most advantageous point of its addition will depend on the particular coloring agent used, and the desired color of the product; these variables are therefore best determined by routine test.

After casting into molds, the organopolysiloxane resins are heat cured. Further polymerization proceeds at this step, since the resin becomes increasingly hard.

Some of the silane esters cited were redistilled to give very pure materials as follows: methyltriethoxysilane, boiling point 141° C.; phenyltriethoxysilane, boiling point 234° C.; and diphenyldiethoxysilane, boiling point 300° C. The other reagents employed were of commercial purity unless otherwise described; distilled water was used throughout. Modulus of rupture was determined on samples which were cut as strips from the molded and cured resins described. Testing was carried out on an Instron Tensile Testing Machine (Model TTCM1), using a three-point loading flexure fixture which supports the sample at a 1.250-inch span beneath, while applying the force on the middle of the opposite side, parallel to the cut edges, at a rate of 0.1 inch of travel per minute. The force which caused failure was then used to calculate the modulus of rupture in pounds per square inch in the usual way.

At any time prior to the precure step, the mixtures can be stored in a sealed container before proceeding further. The final cure can be hastened and stresses in the final product can be avoided by removing the bodies from their molds when they have solidified sufficiently to be self-supporting, and then returning them to the furnace.

In general, the preferred amount of water used with the methyltrialkoxysilane and phenyltriethoxysilane monomers is about 1.5 moles to 3 moles of water per mole of methyltrialkoxysilane plus phenyltrialkoxysilane.

In one method of preparing an improved thermoset resin according to the present invention, the method comprises the steps of heating a mixture which comprises a hydrolyzable methyltrialkyloxysilane of the formula $CH_3Si(OR)_3$, a hydrolyzable phenyltrialkoxysilane of the formula $C_6H_5Si(OR)_3$, and water in a relative molar ratio of $x:y:\frac{3}{2}(x+y)$, respectively, wherein $x$ and $y$ are independently selected from the range 1 to 5, wherein R represents an alkyl radical which contains less than five carbon atoms, at temperatures of from 20 centigrade degrees below its reflux temperature to its reflux temperature for a time of from 2 to 4 hours, removing by volatilization 70 to 80 mole percent of the alkanol side product, heating the resultant resinous concentrate at a temperature within the range of 120° C. to 175° C. for a time of up to ten minutes, and finally heating the mixture thus obtained at temperatures in the range of from one centigrade degree to 60 centigrade degrees below the boiling point of pure water at the prevailing pressure for a time of up to five days.

Another method of preparing a resin comprises the steps of heating under reflux a mixture which comprises methyltriethoxysilane, phenyltriethoxysilane, and water in a relative molar ratio of $x:y:3(x+y)$, respectively, wherein $x$ and $y$ are independently selected from the range 1 to 3, for a time of 2 to 4 hours, removing by distillation 70 to 80 mole percent of the ethanol side product, heating the resultant resinous concentrate at a temperature within the range about 110° C. to 200° C. and more preferably between 120° C. to 160° C. for a time up to ten minutes, heating the mixture thus obtained at temperatures of about 90° C. for about 1 to 3 days, and finally at about 135° C. for about 1 to 3 days.

Examples 1 to 4 describe experiments in which the reactants are methyltriethoxysilane, phenyltriethoxysilane, and water, in a relative molar ratio of 2:1:9, respectively; Example 5 describes procedures in which this ratio has been altered to other values; Example 6 describes the use of ethanol as a solvent for the reaction medium; Example 7 describes the formation of copolymers from separate initial hydrolysis of the monomers; Examples 8 to 13 describe the methods used for inclusion of additives and/or coreactants; and Example 14 describes a procedure for preparing machinable organopolysiloxane bodies which are stable at temperatures above 350° C. Molar quantities in parentheses are close approximations, and in each example acid is present as an impurity in the starting monomer for the hydrolysis thereof.

Example 1

Examples 1A–E describe procedures in which the reaction mixture comprises methyltriethoxysilane, phenyltriethoxysilane, and water in a relative molar ratio of 2:1:9, respectively; the actual quantities used are cited in the specific examples.

A. A 250-ml., three-necked flask was equipped with a thermometer, magnetic stirrer, and condenser; the condenser carried a take-off to allow reflux or distillation. In the flask thus prepared were placed 94 ml. (0.5 mole) of methyltriethoxysilane, 60 ml. (0.25 mole) of phenyltriethoxysilane, and 40.5 ml. (2.25 moles) of water. The resultant two-phase mixture was heated to about 80° C.; after about five minutes a one-phase system was formed. The mixture thus obtained was heated under reflux with stirring for four hours. At the end of this time, 105 ml. of 95% ethanol was distilled; the residual reaction mixture was transferred to a 300-ml. beaker, and heated momentarily to 120° C., with stirring to effect precure. The clear, viscous resin thus obtained was transferred to circular aluminum foil molds, two inches in diameter and one-half inch deep, and then subjected to a final cure at 85–90° C. for about 48 hours. The final products were machinable, heat resistant, thermoset organopolysiloxane bodies.

B. The procedure of Example 1A was repeated, except that distillation of ethanol was carried out continuously during the initial four-hour reaction period; 100 ml. of 95% ethanol was obtained. The reaction mixture was heated momentarily to 130° C. with stirring to effect precure, and then placed in the molds previously described. One sample was cured at room temperature, and yielded a soft, putty-like resin. The other sample was cured at 90° C. for about 48 hours, and produced a clear, machinable thermoset organopolysiloxane body.

C. The procedure of Example 1A was repeated, and 100 ml. of 95% ethanol was removed from the reaction mixture by distillation as therein described. The residual resinous material was heated momentarily to 140° C. with stirring to effect precure, and then cast and cured as previously described. The final samples were clear, hard, heat resistant, thermoset organopolysiloxane bodies.

D. The procedure of Example 1A was repeated, except that an additional 4 ml. of water was added to the amount therein described. 100 ml. of 95% ethanol was removed by distillation, and the residual resinous mixture was subjected to precure at 140 °C., with stirring. Samples were cast and cured by the procedure cited above, to give hard, thermoset organopolysiloxane bodies which contained slight internal cracks.

E. A 500-ml., three-necked flask was equipped with a thermometer, magnetic stirrer, and condenser; the condenser carried a take-off to allow reflux or distillation. In the flask thus prepared were placed 190 ml. (1 mole) of methyltriethoxysilane, 120 ml. (0.5 mole) of phenyltriethoxysilane, and 81 ml. (4.5 moles) of water. The resultant mixture was heated under reflux for four hours, and then 205 ml. of 95% ethanol was removed by distillation. The residual reaction mixture was subjected to precure by heating to 140° C. with stirring. The resultant resin mixture was cast and cured as described in Example 1A to give machinable, heat-resistant thermoset organopolysiloxane bodies. A sample of the resin obtained after the precure was poured into a rectangular aluminum foil mold 8 inches by 5.25 inches by 0.75 inch; subsequent curing at 90° C. for 48 hours produced a clear, hard, thermoset organopolysiloxane body of these dimensions. The sample thus prepared was trimmed with a band saw, ground to uniform dimensions with an abrasive wheel, and then polished with a softer abrasive wheel using a colloidal grinding agent.

Example 2

In Examples 2A–F shown in Table I below, the reaction mixture comprised methyltriethoxysilane, phenyltriehoxysilane, and water in a relative molar ratio of 2:1:9; the actual quantities used in each experiment were 270 ml. (1.5 moles) of methyltriethoxysilane, 180 ml. (0.75 mole) of phenyltriethoxysilane, and 123 ml. (6.75 moles) of water. The apparatus used was similar to that described in Example 1, except that a 1000-ml. flask was employed; 300 ml. of 95% ethanol was distilled from the reaction mixture in each instance. After the precure conditions indicated in the table, final cure was carried out on samples two inches in diameter and one-half inch thick at 90° C. for about 72 hours. Where no precure time is indicated, heating at the temperature shown was momentary. In each case, the product was a machinable, heat-resistant thermoset organopolysiloxane body.

TABLE I

| Example Number: | Reflux Time, hrs. | Precure Temperature, °C. | Precure Time, mins. | Modulus of rupture, p.s.i. |
|---|---|---|---|---|
| 2A-1 | 1 | 120 | | |
| 2A-2 | 1 | 120 | 3 | |
| 2A-3 | 1 | 120 | 6 | |
| 2A-4 | 1 | 140 | | |
| 2B-1 | 2 | 120 | 3 | 4,250 |
| 2B-2 | 2 | 120 | 6 | 6,910 |
| 2B-3 | 2 | 120 | 10 | 4,550 |
| 2B-4 | 2 | 160 | | 6,140 |
| 2C-1 | 3 | 120 | 3 | 8,010 |
| 2C-2 | 3 | 120 | 6 | 8,390 |
| 2C-3 | 3 | 120 | 10 | 9,580 |
| 2C-4 | 3 | 140 | | 7,400 |
| 2C-5 | 3 | 160 | | 7,640 |
| 2D-1 | 4 | 120 | | 6,120 |
| 2D-2 | 4 | 120 | 3 | 6,880 |
| 2D-3 | 4 | 120 | 6 | 6,440 |
| 2D-4 | 4 | 120 | 10 | 4,850 |
| 2D-5 | 4 | 140 | | 6,130 |
| 2D-6 | 4 | 160 | | 5,610 |
| 2E-1 | 5 | 120 | | 6,190 |
| 2E-2 | 5 | 120 | 3 | 6,710 |
| 2E-3 | 5 | 120 | 6 | 6,700 |
| 2E-4 | 5 | 120 | 10 | 6,660 |
| 2E-5 | 5 | 140 | | 6,120 |
| 2E-6 | 5 | 160 | | 6,210 |
| 2F-1 | 6 | 210 | | 6,270 |
| 2F-2 | 6 | 120 | 3 | 6,730 |
| 2F-3 | 6 | 120 | 6 | 6,800 |
| 2F-4 | 6 | 140 | | 6,660 |
| 2F-5 | 6 | 160 | | 5,610 |

Example 3

A. By the procedure of Example 1, a reaction mixture which comprises 380 ml. (2 moles) of methyltriethoxysilane, 240 ml. (1 mole) of phenyltriethoxysilane, and 162 ml. (9 moles) of water was heated under reflux for four hours. At the end of this time 410 ml. of 95% ethanol was distilled, and the residual resin composition was subjected to a momentary precure temperature of 140° C. with stirring. An aluminum foil-lined mold in the shape of a triangular prism of altitude 2 inches, base 3.75 inches and depth 15 inches was preheated to 90° C. and then filled with the reaction mixture thus obtained; curing was effected at 90° C. for approximately 72 hours. The resultant product was a machinable, heat resistant, thermoset organopolysiloxane body with the dimensions of the mold. The sample thus prepared was trimmed with a band saw, ground to uniform dimensions with an abrasive wheel, and then polished with a softer abrasive wheel using a colloidal grinding agent.

B. A reaction mixture prepared by the procedure of Example 1 was subsequently precured momentarily at 130° C., and then poured into a preheated, aluminum foil-lined mold, one inch in diameter and five inches long. The sample thus obtained was cured at 90° C. for approximately 72 hours to give a heat resistant, thermoset organopolysiloxane rod of the mold dimensions. The rod thus obtained was turned on a lathe to uniform dimensions, and then ground to a high polish with a soft grinding wheel, using a colloidal grinding agent.

Example 4

In a 2-liter kettle equipped with a thermometer, stirrer, and condenser adapted to allow reflux or distillation were placed 855 ml. (4.5 moles) of methyltriethoxysilane, 540 ml. (2.25 moles) of phenyltriethoxysilane, and 360 ml. (20.25 moles) of water; the relative molar ratio of reactants was 2:1:9, respectively. The mixture thus obtained was heated under reflux for four hours, and then 745 ml. of 95% ethanol was distilled. The distillation residue was subjected to a precure temperature of 125° C. with stirring, and then cast into disks as described in Example 1A. The samples thus obtained were cured at 90° C. for approximately 48 hours to give machinable, heat-resistant thermoset organopolysiloxane bodies.

Example 5

In Examples 5A–G shown in Table II, below, the relative molar ratios of reactants were altered from methyltri-

TABLE II

| Example Number: | Molar Ratios | | 95% Ethanol Distilled, ml. | Precure Temperature, ° C. |
| --- | --- | --- | --- | --- |
| | Relative | Actual | | |
| 5A | 1:1:6.7 | 0.3:0.3:2 | 60 | 120 |
| 5B | 2:1:4.5 | 0.5:0.25:1.12 | 70 | 150 |
| 5C | 2:1:6.64 | 0.5:0.25:1.66 | 100 | 140 |
| 5D | 2:1:8 | 0.5:0.25:2 | 90 | 190 |
| 5E | 3:1:12 | 0.6:0.2:2.4 | 100 | 120 |
| 5F | 4:1:18 | 0.6:0.15:2.7 | 70 | 120 |
| 5G | 5:1:18 | 0.5:0.1:1.8 | 80 | 140 |

Example 6

In the experiments designated as Examples 6A–E in Table III, 95% ethanol was added to the initial reaction mixture as a common solvent for the reactants. The variations in procedure relevant to each example are shown in the table; the procedure common to all examples follows.

A 1000-ml., three-necked flask was equipped with a thermometer, stirrer, and condenser; the condenser carried a take-off to allow reflux or distillation. In the flask thus prepared were placed 285 ml. (1.5 moles) of methyltriethoxysilane, 180 ml. (0.75 mole) of phenyltriethoxysilane, and 111 ml. (6.75 moles) of water; the relative molar ratio was therefore 2:1:9, respectively. To the mixture thus obtained was added 255 ml. of 95% ethanol, and the resultant mixture was heated under reflux with stirring; 95% ethanol was subsequently removed by distillation, and precure was accomplished as shown in Table III. The resinous mixtures thus obtained were placed in the circular molds described in Example 1A, and then cured at 90° C. for about 72 hours. In each case the resultant products were machinable, heat resistant, thermoset, organopolysiloxane bodies.

TABLE III

| Example Number | Reflux Time, hrs. | 95% Ethanol Distilled, ml. | Precure | | Modulus of Rupture, p.s.i. |
| --- | --- | --- | --- | --- | --- |
| | | | Temperature, ° C. | Time, mins. | |
| 6A-1 | 1 | 525 | 120 | | 813 |
| 6A-2 | 1 | 525 | 120 | 3 | 802 |
| 6A-3 | 1 | 525 | 120 | 6 | 918 |
| 6A-4 | 1 | 525 | 120 | 10 | 1,890 |
| 6A-5 | 1 | 525 | 140 | | 952 |
| 6A-6 | 1 | 525 | 160 | | 2,450 |
| 6B-1 | 2 | 555 | 120 | | 7,820 |
| 6B-2 | 2 | 555 | 120 | 3 | 8,080 |
| 6B-3 | 2 | 555 | 120 | 6 | 7,190 |
| 6B-4 | 2 | 555 | 120 | 10 | 8,250 |
| 6B-5 | 2 | 555 | 140 | | 6,970 |
| 6B-6 | 2 | 555 | 160 | | 7,670 |
| 6C-1 | 3 | 555 | 120 | | 6,060 |
| 6C-2 | 3 | 555 | 120 | 3 | 6,250 |
| 6C-3 | 3 | 555 | 120 | 6 | 8,090 |
| 6C-4 | 3 | 555 | 120 | 10 | 6,630 |
| 6C-5 | 3 | 555 | 140 | | 8,140 |
| 6C-6 | 3 | 555 | 160 | | 3,840 |
| 6D-1 | 4 | 555 | 120 | | 2,650 |
| 6D-2 | 4 | 555 | 120 | 3 | 2,490 |
| 6D-3 | 4 | 555 | 120 | 6 | 3,580 |
| 6D-4 | 4 | 555 | 140 | | 4,140 |
| 6D-5 | 4 | 555 | 160 | | 3,580 |
| 6E-1 | 6 | 550 | 120 | | 4,510 |
| 6E-2 | 6 | 550 | 120 | 3 | 3,080 |
| 6E-3 | 6 | 550 | 120 | 10 | 2,790 |
| 6E-4 | 6 | 550 | 140 | | 1,190 |
| 6E-5 | 6 | 550 | 160 | | 3,310 | ethoxysilane:phenyltriethoxysilane:water of 2:1:9 cited in the preceding examples to the values indicated; the actual molar quantities employed are indicated in the same sequence. Reflux was maintained for four hours and the alkanol by-product being distilled off was, as is normally the case, a mixture of about 95% by weight of ethanol and 5% by weight of water. Following the concentration step, the precure time was momentary. In each experiment samples were cast as disks as described in Example 1A, and subsequently cured at 90° C. for about 48 hours to give machinable, heat resistant, thermoset, organopolysiloxane bodies.

Example 7

Examples 7A–B represent experiments in which organoalkoxysilanes were independently subjected to hydrolysis and condensation conditions; the resultant resinous mixtures were then combined to produce resins.

A. In a 1000-ml., three-necked flask equipped with heating mantle, stirrer, and reflux condenser were placed 760 ml. (4 moles) of methyltriethoxysilane and 210 ml. (12 moles) of water. The resultant mixture was heated under reflux for four hours, and then 550 ml. of 95% ethanol was removed by distillation. The resinous concentrated reaction mixture was then set aside. Similarly, 720 ml. (3 moles) of phenyltriethoxysilane, 162 ml. (9 moles) of water, and 150 ml. of 95% ethanol were heated under reflux for four hours, and then 500 ml. of 95% ethanol was removed by distillation. In a 500-ml. beaker were placed 60 g. of the methylpolysiloxane resin and 40 g. of the phenylpolysiloxane resin, and the mixture thus obtained was heated momentarily with stirring to 140° C. to effect precure. The resultant reaction mixture was cast into disks as described in Example 1A, and then cured at 90° C. for about 72 hours. The resultant samples were machinable, heat resistant thermoset organopolysiloxane bodies, with a modulus of rupture of 4930 p.s.i.

B. A resin composition was prepared according to the procedure given in Example 1A prior to the precure step. In a 500-ml., three-necked flask equipped with heating mantle, stirrer, and reflux condenser were placed 408 ml. (1.5 moles) of diphenyldiethoxysilane, 54 ml. (3 moles) of water, and 2 drops of 1M hydrochloric acid. The resultant mixture was heated under reflux for four hours, and then 150 ml. of 95% ethanol was removed by distillation. 55 g. of the copolymeric resin and 5 g. of the homopolymeric resin were independently heated to 105° C., and then mixed in a 100-ml. beaker. The reaction mixture thus obtained was heated momentarily with stirring to 170° C., and a disk-shaped sample of the type already described was poured; a second sample was precured to 190° C., and then cast. Both samples were subsequently cured at 90° C. for about 72 hours to give machinable, thermoset, organopolysiloxane bodies stable to about 250° C. The amount of the diphenyldiethoxysilane used was about 5 mole percent of the total silane.

Example 8

Examples 8 through 12 represent experiments in which various additives were incorporated in the reaction mixture described in Example 1A.

A. In the apparatus described in Example 1A were placed 95 ml. (0.5 mole) of methyltriethoxysilane, 60 ml. (0.25 mole) of phenyltriethoxysilane, and 41 ml. (2.25 moles) of water; the relative molar ratio of these reactants is 2:1:9, respectively. 0.5 g. of Bentone 34, an amine-clay derivative, was added, and the resultant mixture was heated under reflux for four hours. At the end of this time 100 ml. of 95% ethanol was removed by distillation, and the distillation residue was momentarily precured with stirring at 90° C.; foaming occurred. The resultant mixture was poured into a circular mold and cured as described in Example 1A to give a translucent, hard, heat-resistant, thermoset organopolysiloxane body.

B. The procedure of Example 8A was repeated, except that 1 g. of Bentone 34 was used, and the precure temperature was raised to 110° C. The resultant samples were nearly opaque and severely cracked.

Example 9

In Examples 9A and 9B shown in Table IV below, diphenyldiethoxysilane was introduced into the initial reaction mixture. In the apparatus described in Example 1A were placed 95 ml. (0.5 mole) of methyltriethoxysilane, 60 ml. (0.25 mole) of phenyltriethoxysilane, 44 ml. (2.45 moles) of water (the relative molar ratio of these reactants is therefore 2:1:9.8) and the quantity of diphenyldiethoxysilane shown in the table. The mixture thus obtained was heated under reflux with stirring for four hours, and the quantity of 95% ethanol shown in the table was removed by distillation. The reaction mixture was precured under conditions shown, and then subjected to casting and final cure as described in Example 1A. The samples in each case were machinable, heat-resistant, thermoset organopolysiloxane bodies.

TABLE IV

| | Diphenyldiethoxy- silane added, mole | 95% Ethanol Distilled, ml. | Precure | |
|---|---|---|---|---|
| | | | Temperature, ° C. | Time |
| Example Number: | | | | |
| 9A | 0.041 | 110 | 150 | |
| 9B-1 | 0.063 | 100 | 160 | |
| 9B-2 | 0.063 | 100 | 200 | |
| 9B-3 | 0.063 | 100 | 210 | |

Example 10

In the apparatus described in Example 1A were placed 95 ml. (0.5 mole) of methyltriethoxysilane, 60 ml. (0.25 mole) of phenyltriethoxysilane, and 45 ml. (2.5 moles) of water (relative molar ratio 2:1:10, respectively). Heating and stirring were begun, and when the temperature reached 80° C., 15 ml. (0.067 mole) of ethyl orthosilicate was added. The resultant mixture was heated under reflux for four hours, and then 100 ml. of 95% ethanol was removed by distillation. The residual resinous mixture was transferred to a 250-ml. beaker, and then subjected to precure at 120° C., with stirring; a second sample was similarly precured at 140° C. Both mixtures were subsequently cast and cured as described in the cited example to give clear, machinable, heat-resistant organopolysiloxane, bodies.

Example 11

Examples 11A–D in Table V below illustrate the use of a di- or tri-substituted organosilane as an additive to the primary reaction mixture wherein it may function as a catalyst or coreactant.

A reaction mixture was prepared as described in Example 1A, and the quantity of 95% ethanol therein described was subsequently distilled. To separate 50-g. samples of the resinous distillation residue thus obtained were added, by means of a syringe, each of the organosilanes shown in the table. The subsequent precure was effected momentarily with stirring at 140° C., and the final cure was achieved at 90° C. for approximately 72 hours.

TABLE V

| | Additive | Modulus of rupture, p.s.i. |
|---|---|---|
| Example No.: | | |
| 11A | 0.5 ml. (0.002 mole) triphenylsilane, B.P. 152–155° C./2–4 mm | 7,760 |
| 11B | 0.5 ml. (0.002 mole) trihexylsilane, B.P. 155° C./0.1 mm | 7,620 |
| 11C | 0.5 ml. (0.004 mole) triethoxysilane, B.P. 108° C./745 mm | 7,000 |
| 11D | 0.5 ml. (0.003 mole) diphenylsilane, B.P. 71–72° C./0.1 mm | 5,960 |

Example 12

A reaction mixture was prepared as described in Example 1A, and the quantity of 95% ethanol therein described was subsequently distilled. To a 40-g. sample of the resinous distillation residue was added about 5 g. of activated silica; the silica had previously been treated to remove water by heating at 900° C. for three hours under vacuum, 1000° C. for sixteen hours under vacuum, and subsequently allowing it to come to ambient temperature in a vacuum desiccator. The mixture thus obtained was precured momentarily with stirring at 140° C., and then cast and cured as described in Example 1A. The resultant products were translucent, hard, thermoset, organopolysiloxane bodies.

Example 13

A. In the apparatus described in Example 1A were placed 95 ml. (0.5 mole) of methyltriethoxysilane, 60 ml. (0.25 mole) of phenyltriethoxysilane, and 40.5 ml. (2.25 moles) of water. A solution of hydrochloric acid in ethanol was prepared by dissolving one drop of 1 M HCl in 10 ml. of 95% ethanol, and one drop of the solution thus obtained was again added to 10 ml. of 95% ethanol. One drop of the solution thus obtained was added to the reaction mixture, which was then heated under reflux for four hours. At the end of this time, 110 ml. of 95% ethanol was removed by distillation, and the distillation residue was subjected to a momentary precure, with stirring, at 140° C. Samples cast and cured by the procedure of the cited example yielded machinable, heat resistant, thermoset organopolysiloxane bodies.

B. The procedure of Example 13A was repeated, except that the ethanol-hydrochloric acid solution therein described was replaced by 10 ml. of a solution of sodium hydroxide of identical molar concentration. The final products were translucent, hard thermoset organopolysiloxane bodies containing internal cracks.

C. A reaction mixture was prepared as described in Example 13B, and heated under reflux for two hours. At the end of this time 10 ml. of diulte ethanolic hydrochloric acid, prepared as described in Example 13A, was added, and heating under reflux was continued for an additional two hours. Subsequent procedure was that described in the cited examples, and produced samples which were machinable, heat resistant, organopolysiloxane bodies.

D. The procedure of Example 13C was repeated, except that the order of introduction of the ethanolic sodium hydroxide and ethanolic hydrochloric acid solutions therein cited was reversed. The products were machinable, heat resistant, organopolysiloxane bodies.

Example 14

The procedure of this example provides a method of preparing an especially heat resistant resin which shows less strain under polarized light than those of preceding examples.

A. An organopolysiloxane mixture prepared by the procedure of Example 1A was subsequently divided into separate samples which were then precured momentarily at temperatures of 120°, 140°, and 160° C., cast into disks as previously described, and subjected to a final cure at 90° C. for five days. At the end of this time, the samples were subjected to a further cure for two days at 135° C., and then for an additional two days at 200° C. The machinable, thermoset organopolysiloxane bodies thus prepared were heated to temperatures of 300° to 315° C. without failing.

B. An even greater degree of heat resistance was obtained by subjecting a sample, prepared and cured according to the procedure of Example 14A, to a further cure at 250° C. for 18 hours, followed by cooling to room temperature over 90 minutes. The sample thus prepared was a machinable, thermoset organopolysiloxane body, stable to temperatures above 355° C., which withstood a temperature of 300° C. for two hours.

Example 15

A. A 250-ml., three-necked flask was equipped with a thermometer, magnetic stirrer, and condenser; the condenser carried a take-off to allow reflux or distillation. In the flask thus prepared were placed 94 ml. (0.5 mole) of methyltriethoxysilane, 60 ml. (0.25 mole) of phenyltriethoxysilane, 40.5 ml. (2.25 moles) of water, and 0.25 gram of Sudan IV (Scarlet Red) dye. The resultant two-phase mixture was heated to about 80° C.; after about five minutes a one-phase system was formed. The mixture thus obtained was heated under reflux with stirring for four hours. At the end of this time, 105 ml. of 95% ethanol was distilled; the residual reaction mixture was transferred to a 300-ml. beaker, and heated momentarily to 120° C., with stirring, to effect precure. The red, viscous resin thus obtained was transferred to circular aluminum foil molds, two inches in diameter and one-half inch deep, and then subjected to a final cure at 85–90° C. for about 48 hours. The final products were scarlet, machinable, heat-resistant, thermoset organopolysiloxane bodies.

B. The procedure of Example 15A was repeated, except that 0.25 gram of Sudan IV was added to the concentrated reaction mixture just before precure was effected. The final product was a scarlet, machinable, heat-resistant, thermoset organopolysiloxane body.

C. The procedure of Example 15A was repeated, except that 0.1 gram of fluorescein was substituted for the Sudan IV. The final product was a yellow-green fluorescent, machinable, heat-resistant, thermoset organopolysiloxane body.

D. The procedure of Example 15A was repeated, except that 0.5 gram of Violite Luminescent Pigment Number 200 Green (Rhode Island Laboratories, Inc., West Warwick, R.I.) was substituted for the Sudan IV, and the pigment was added after about half of the alkanol side product had been distilled. The final product was a green, machinable, heat-resistant, thermoset organopolysiloxane body.

Example 16

In Examples 16A–E shown in Table VI below, the reaction mixture comprised methyltriethoxysilane, phenyltriethoxysilane, and water in a relative molar ratio of 2:1:9; the actual quantities used in each experiment were 285 ml. (1.5 moles) of methyltriethoxysilane, 180 ml. (0.75 mole) of phenyltriethoxysilane, and 123 ml. (6.75 moles) of water. These reagents were placed in a 1000-ml., three-necked flask equipped with a thermometer, magnetic stirrer, and condenser; the condenser carried a take-off to allow reflux or distillation. The mixture thus obtained was heated under reflux with stirring for three hours. At the end of this time, 300 ml. of 95% ethanol was distilled; the residual reaction mixture was transferred to a 600-ml. beaker and heated as shown in the table to effect precure. After the precure conditions indicated, final cure was carried out on samples two inches in diameter and one-half inch thick at 90° C. for about 72 hours. Where no precure time is indicated, heating at the temperature shown was momentary. In each case, the product was a machinable, heat-resistant, thermoset organopolysiloxane body with the modulus of rupture shown.

TABLE VI

| | Precure | | Modulus of Rupture, p.s.i. |
| --- | --- | --- | --- |
| | Temperature, ° C. | Time, mins. | |
| Example Number: | | | |
| 16A | 140 | (¹) | 7,400 |
| 16B | 160 | | 7,640 |
| 16C | 120 | 3 | 8,010 |
| 16D | 120 | 6 | 8,390 |
| 16E | 120 | 10 | 9,580 |

¹ Momentary.

Example 17

A. A 2 liter, three-necked round bottom flask was equipped with a thermometer, stirrer and condenser; the condenser carried a take-off to allow reflux or distillation. In the flask thus prepared were placed 720 g. (3 moles) phenyltriethoxysilane, 267 g. (1.5 moles) methyltriethoxysilane, 243 g. (13.5 moles) distilled water and 3.5 ml. of .1 N HCl to give 10 weight parts per million of HCl. The resultant two-phase mixture was heated with stirring to 80–90° C.; after several minutes a one-phase system was formed. The mixture thus obtained was heated under reflux with stirring for 3–4 hours. At the end of this time, 80% of the water-alcohol mixture was distilled. The prepolymer resin solution was then transferred to a large beaker and heated with stirring to 180° C. to further condense the polysiloxane resin. The prepolymer resin was cooled and then dissolved in xylene to give a solution which had a viscosity of 12–15 centipoises at room temperature.

Style 181 neutral pH E-glass cloth was then dipped in this solution and air dried for 2 hours. The cloth was cut into squares 7" x 7", these were stacked to give 14 plies and the stack placed in a press heated to 400° F. Slight pressure was applied until the resin gelled (20 minutes) and then 500 p.s.i. applied for 30 minutes with the temperature remaining at 400° F. The press was cooled to 200° F. and the laminate removed. A postcure of 2 hours at each of the following temperatures: 110° C., 150° C., 180° C., 205° C. and 230° C., and finally 12 hours at 250° C., was given. The resin content of this laminate was 20–22% and the flexural strength at room temperature was excellent, being 27,900 p.s.i. The tangent modulus was also excellent, being $2.3 \times 10^6$ p.s.i.

B. The procedure of Example 17A was repeated using 720 g. (3 moles) phenyltriethoxysilane, 534 g. (3 moles) methyltriethoxysilane, 324 g. (16 moles) distilled water and 5.0 ml. of .1 N HCl (10 p.p.m. HCl). A laminate was prepared by the given procedure described in Example 17A and its physical measurements are listed in Table VII.

C. The procedure of Example 17A was repeated using 360 g. (1.5 moles) phenyltriethoxysilane, 256 g. (2 moles) methyltriethoxysilane, 189 g. (10.5 moles) distilled water and 3.0 ml. of .1 N HCl (10 p.p.m. HCl). A laminate was prepared by the given procedure and its physical measurements are listed in Table VII.

D. The procedure of Example 17A was repeated using 720 g. (3 moles) phenyltriethoxysilane, 178 g. (1.0 mole) methyltriethoxysilane, 216 g. (12.0 moles) distilled water and 2.5 ml. of .1 N HCl (10 p.p.m. HCl). A laminate was prepared by the given procedure and its physical measurements are listed in Table VII.

E. The procedure of Example 17A was repeated using 960 g. (4 moles) phenyltriethoxysilane, 178 g. (1.0 mole) methyltriethoxysilane, 270 g. (15 moles) distilled water and 4.0 ml. of .1 N HCl (10 p.p.m. HCl). A laminate was prepared by the given procedure and its physical measurements are listed in Table VII.

F. The procedure of Example 17A was repeated using 1200 g. (5 moles) phenyltriethoxysilane, 178 g. (1.0 mole) methyltriethoxysilane, 432 g. (24 moles) distilled water and 4.0 ml. of .1 N HCl (10 p.p.m. HCl). A laminate was prepared by the given procedure and its physical measurements are listed in Table VII.

G. The procedure of Example 17A was repeated using 960 g. (4 moles) phenyltriethoxysilane, 119 g. (.67 mole) methyltriethoxysilane, 340 g. (18.8 moles) distilled water and 3.9 ml. of .1 N HCl (total 10 p.p.m. HCl). A laminate was prepared by the given procedure and its physical measurements are listed in Table VII.

TABLE VII

| Example Number | Phenyl:Methyl Ratio | H₂O:Silane Ratio | Flexural Strength, p.s.i. | Modulus×10⁶, p.s.i. |
|---|---|---|---|---|
| 17B | 1:1 | 2.67:1 | 20,400 | 2.78 |
| 17C | 3:4 | 3:1 | 20,700 | 2.99 |
| 17D | 3:1 | 3:1 | 31,400 | 3.06 |
| 17E | 4:1 | 3:1 | 36,600 | 3.40 |
| 17F | 5:1 | 4:1 | 35,770 | 2.19 |
| 17G | 6:1 | 4:1 | 41,000 | 3.29 |

Example 18

A 500 ml., three-necked flask was equipped with a thermometer, magnetic stirrer and a condenser; the condenser carried a take-off to allow reflux or distillation. In the flask thus prepared were placed 178 g. (1 mole) of methyltriethoxysilane, 120 g. (0.5 mole) of phenyltriethoxysilane, 81 g. (4.5 moles) of distilled water, and 0.8 ml. of 0.1 N HCl. This gives an acidity of 10 p.p.m. HCl based on the total charge. The resultant two-phase mixture was heated with stirring to 80–90° C.; after several minutes a one-phase system was formed. The mixture thus obtained was heated under reflux with stirring for 3–4 hours. At the end of this time, 70% of the water-alcohol mixture was distilled. The temperature of the resin reaching 90° C., a resin coating solution was then prepared by dissolving the resin in n-butanol to give a solution containing about 40% solids.

Aluminum and copper panels were thoroughly cleaned prior to coating. Copper panels were cleaned with a copper cleaner to remove the oxide film and any adhering dirt. The panels were then washed with acetone and air dried. The aluminum panels were given a 24 hour soak in acetone, wiped clean, then given several acetone rinses and air dried. The panels were then coated by dipping in the resin solution described above. Copper panels were cured 15–20 minutes at 150° C. while aluminum panels were cured at 175° C. for 15–20 minutes. Clear, hard coatings were obtained in both cases which were approximately 0.5 mil thick and which survived 20% and 10% impact elongations on the copper and aluminum, respectively.

The above-reported impact elongation tests to determine the impact flexibility of the coatings were made with a G.E. impact flexibility tester. This instrument generally determines the relative flexibility of a paint, varnish or enamel film expressed as percentage elongation, in a range of 0.5 to 60% as based on the impact of a solid metal cylinder dropped through a guide track from a height of 4 feet onto the reverse side of a coated test panel. The end of the cylindrical impactor is studded with a group of spherical knobs varying in size and calibrated in terms of percent flexibility, based on the elongation or draw they can produce in a metal panel. A reading is made by observing the last indentation in ascending order to show no cracking of the coating.

Unless otherwise noted, the viscosity in centipoises used herein is that measured with an RVF Brookfield viscometer in accordance with ASTM 2196–63T, "Rheological Properties of Non-Newtonian Liquids."

As will be evident to those skilled in the art, modifications of this invention can be made or followed in the light of the foregoing disclosure without departing from the spirit and scope of the disclosure or from the scope of the claims.

What is claimed is:

1. The method of preparing an organopolysiloxane resin, which is capable of being further cured, by the steps of
I. heating a mixture of
A. a methyltrialkoxysilane having the general formula $CH_3Si(OR)_3$ wherein R in each —OR grouping represents an alkyl radical having less than five carbon atoms,
B. a phenyltrialkoxysilane having the general formula $C_6H_5Si(OR)_3$ wherein R in each —OR grouping also represents an alkyl radical having less than five carbon atoms,
the ratio of moles of the reactants of A and B being from 1:10 to 10:1,
C. from 0 to 10 mole percent, based on total silane reactant material, of at least one compound different from the reactant of A and from the reactant of B and which is represented by the general formula

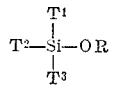

wherein $T^1$, $T^2$ and $T^3$ represent monovalent hydrocarbon radicals independently selected from the group consisting of aryl, alkyl and alkenyl radicals, each of which contains less than seven carbon atoms, and the alkoxy radical RO—, wherein R represents an alkyl radical of less than five carbon atoms, and
D. water in an amount corresponding to at least 0.5 equivalent weight per one equivalent weight of said RO— groups that are present in the reactants of A, B, and C, said mixture containing less than 0.01 mole of acid per mole of total silane reactant material, and the heating of the said mixture to form a liquid siloxane partial condensation product being for from 1 to 10 hours at a temperature between ambient temperature and the reflux temperature while retaining therein alkanol that is a by-product of hydrolysis of the starting silane reactant material;

II. concentrating the liquid siloxane partial condensation product from Step I by volatilizing therefrom between 50 and 90 mole percent of the total by-product alkanol contained therein, as well as some water, thereby to obtain a liquid residue of siloxane partial condensation product; and III. precuring the concentrated liquid siloxane partial condensation product from Step II by heating it at a temperature within the range of from 70° C. to 400° C. at ambient pressure thereby to obtain a more highly condensed siloxane partial condensation product that is adapted to be cast and finally cured, without severe cracking, to a solid thermoset organosiloxane resin.

2. The precured siloxane partial condensation product resulting from the method of claim 1.

3. The method as in claim 1 wherein the water is present in the mixture of starting silane reactants in a molar ratio of from 1.5 to about 3 moles thereof per mole of total silane reactant material.

4. The method as in claim 1 which includes the further step of finally curing the precured, further curable siloxane partial condensation product from Step III by subjecting it to a temperature-time period corresponding to a temperature of from 25° C. to about 95° C. at about atmospheric pressure for a period of time ranging from one day to one week thereby to convert the said precured siloxane partial condensation product to a thermoset organopolysiloxane.

5. The thermoset organopolysiloxane resulting from the method of claim 4.

6. The method as in claim 1 wherein the methyltrialkoxysilane of A is methyltriethoxysilane; the phenyltrialkoxysilane of B is phenyltriethoxysilane; the ratio of moles of the reactants of A and B is from 1:5 to 5:1; the water is present in the mixture of starting silane reactants in a molar ratio of from 1.5 to about 3 moles thereof per mole of total silane reactant material; the liquid siloxane partial condensation product from Step I is concentrated by volatilizing therefrom from 70 to 80 mole percent of the total by-product alkanol contained therein as well as some water; and the concentrated liquid siloxane partial condensation from Step II is precured by heating it at a temperature within the range of from 110° C. to 200° C. at ambient pressure for a period of time up to 10 minutes.

7. The method as in claim 6 wherein the water is present in the mixture of starting silane reactants in a molar ratio of about 3 moles thereof per mole of total silane reactant material.

8. The method as in claim 1 wherein the compound of C constitutes at least one mole percent but not more than about 5 mole percent of the total of A, B and C.

9. A method as defined in claim 1 in which the methyltrialkoxysilane of A is methyltriethoxysilane, the phenyltrialkoxysilane of B is phenyltriethoxysilane, the ratio of moles of methyltriethoxysilane to phenyltriethoxysilane is about 2:1, the heating of Step I is at about 80 to 90° C., the partial condensation product of Step I is concentrated by volatilizing therefrom about 70 to 80 mole percent of the total by-product alkanol contained therein as well as some water, and the precuring of Step III is at a temperature of about 105° C. to 250° C.

10. A method as defined in claim 1 in which the methyltrialkoxysilane of A is methyltriethoxysilane, the phenyltrialkoxysilane of B is phenyltriethoxysilane, the ratio of moles of methyltriethoxysilane to phenyltriethoxysilane is about 1:4, the heating of Step I is at about 80 to 90° C., and the partial condensation product of Step I is concentrated by volatilizing therefrom about 70 to 80 mole percent of the total by-product alkanol contained therein as well as some water.

References Cited

UNITED STATES PATENTS

| | | | |
|---|---|---|---|
| 3,000,858 | 9/1961 | Brown | 260—46.5 |
| 3,208,972 | 9/1965 | Lyons | 260—46.5 |
| 3,245,918 | 4/1966 | Burzynski | 260—46.5 |
| 3,257,330 | 6/1966 | Burzynski et al. | 252—316 |
| 3,354,095 | 11/1967 | Burzynski et al. | 252—316 |

FOREIGN PATENTS

| | | |
|---|---|---|
| 1,082,116 | 9/1967 | Great Britain. |

DONALD E. CZAJA, *Primary Examiner.*

M. I. MARQUIS, *Assistant Examiner.*